US007698226B2

(12) United States Patent
Torii (10) Patent No.: US 7,698,226 B2
(45) Date of Patent: Apr. 13, 2010

(54) INFORMATION PROCESSING APPARATUS AND CONTROLLING METHOD OF THE SAME

(75) Inventor: Kan Torii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1209 days.

(21) Appl. No.: 11/148,296

(22) Filed: Jun. 9, 2005

(65) Prior Publication Data

US 2006/0005242 A1    Jan. 5, 2006

(30) Foreign Application Priority Data

Jun. 11, 2004  (JP)  ............................. 2004-174603

(51) Int. Cl.
    *G06F 21/00*    (2006.01)
(52) U.S. Cl. ........................................ 705/59; 717/169
(58) Field of Classification Search .................. 705/59; 717/169
    See application file for complete search history.

(56) References Cited

U.S. PATENT DOCUMENTS 5,634,012 A * 5/1997 Stefik et al. .................. 705/39
7,124,302 B2 * 10/2006 Ginter et al. ................. 713/189
7,165,718 B2 * 1/2007 Blancas et al. ............... 235/380
2004/0010325 A1 * 1/2004 Naitoh .......................... 700/65
2004/0117784 A1 * 6/2004 Endoh .......................... 717/169

FOREIGN PATENT DOCUMENTS

JP      05-197542       8/1993
JP      2003-195968 A   7/2003

\* cited by examiner

*Primary Examiner*—Andrew J. Fischer
*Assistant Examiner*—Jamie Kucab
(74) *Attorney, Agent, or Firm*—Fitzpatrick, Cella, Harper & Scinto (57) ABSTRACT

The present invention provides an information processing apparatus in which a limiting value of a counter for restricting the use of the apparatus can be dynamically set and changed in a secure method and a controlling method of the information processing apparatus. License information including an appliance serial number of a copy machine SC1 and a new limiting value is input to the copy machine with a counter function that restricts a function when a counter value reaches a limiting value. The input license information is determined whether it is valid or not. If it is determined valid, a saved limiting value is updated to the new limiting value included in the license information.

6 Claims, 6 Drawing Sheets

INFORMATION PROCESSING APPARATUS AND CONTROLLING METHOD OF THE SAME

FIELD OF THE INVENTION

The present invention relates to an information processing apparatus that restricts the function when a counter value reaches the limiting value and a controlling method of the apparatus.

BACKGROUND OF THE INVENTION

A mechanism called "counter" is used mostly for counting the number of copies in an information processing apparatus such as a copy machine or counting the number of days using software in trial. Generally, in such information processing apparatus, an integral value is used for a counter value to be counted by the counter. The counter value is incremented or decremented for each use according to the embodiments.

In the conventional general techniques, methods below are known as a method for restricting a function of an information processing apparatus by using a counter.

(1) A method for disabling an information processing apparatus when a counter value reaches the upper limit, wherein the information processing apparatus is equipped with a counter mechanism that increments the counter value, and the counter value has the upper limit.

(2) A method for disabling an information processing apparatus when a counter value decrements from an initial value to reach the lower limit, wherein the information processing apparatus is equipped with a counter mechanism that decrements the counter value, and the counter value has the lower limit (e.g., 0).

The upper limit and the lower limit of a counter will be collectively called "limiting value" below.

Method for changing the upper limit or the like of a counter from outside the information processing apparatus equipped with the abovementioned conventional counter mechanism conventionally include methods below.

(1) A screen or the like that is not used by a general user is prepared and a specific user (administrator) sets or changes the current value or the limiting value of a counter on the screen or the like.

(2) License information that cannot be created by a general user is supplied to an information processing apparatus and the information processing apparatus sets or changes the current value or the limiting value of a counter based on the contents of the supplied license information. The method is executed with a method of a digital signature or the like using a private key for preventing a general user from creating license information. A method for restricting a period of service for an information processing apparatus with the abovementioned license information has been known (for example, see Japanese Patent Laid-Open No. 5-197542).

However, among the abovementioned methods of changing a limiting value or the like of a counter from outside, in the first method of preparing a screen that is not used by a general user, processes to reach the setting or changing screen need to be prevented from being leaked to a general user. Thus, the procedure of reaching the screen should be much complicated, which in turn makes management of the information quite troublesome. Even if the information is not leaked, a general user may find out how to manipulate the information. Therefore, the first method is not completely secure.

On the contrary, the latter method of supplying the apparatus with license information is more secure than the abovementioned first method of using a screen, and can be used where advanced security is needed. However, a conventional method of supplying the apparatus with license information including a limiting value of a counter and setting the limiting value of the counter is an operating method which ignores the supplied current value of the counter of the apparatus, lacking flexibility and hard to be operated.

In order to perform a flexible operation, a method of including incrementing information of a counter in license information can be considered. However, even in this method, a general user may use the same license information and repeatedly change the counter value. In order to avoid this risk, the license information needs to include an expiration date or the apparatus needs to record used license information, which makes the method very complicated.

The abovementioned conventional methods have weakness respectively. For example, when license information includes an expiration date, another problem occurs in that a general user who has not made use of a function of the information processing apparatus by the expiration date has to bear an extra cost. As an information processing apparatus has the limit for the number of license information pieces to record, another problem occurs about dealing with license information pieces over the limit when the apparatus records used license information.

An information processing apparatus in which a limiting value of a counter for restricting the use of the apparatus can be dynamically set and changed in a secure method and a controlling method of the information processing apparatus.

SUMMARY OF THE INVENTION

In order to solve the abovementioned problem, the present invention is an information processing apparatus with a counter function that restricts a function when the counter value reaches a limiting value, comprising:
saving means for saving the limiting value;
inputting means for inputting license information including identification information of the information processing apparatus and a new limiting value;
determination means for determining whether the input license information is valid or not based on the identification information; and
updating means for updating the limiting value saved in the saving means to the new limiting value included in the license information if the determination means determines that the license information is valid.

In order to solve the abovementioned problem, the present invention is a controlling method of an information processing apparatus with a counter function that restricts a function when the counter value reaches a limiting value, comprising:
a saving step of saving the limiting value in a saving device;
an inputting step of inputting license information including identification information of the information processing apparatus and a new limiting value;
a determining step of determining whether the input license information is valid or not based on the identification information; and
an updating step of updating the limiting value saved in the saving means to the new limiting value included in the license information if the determination means determines that the license information is valid.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

DETAILED DESCRIPTION OF THE PREFERRED EMBODIMENTS

An information processing apparatus and a method for controlling the information processing apparatus according to an embodiment of the present invention will be described below with reference to drawings. An information processing apparatus for restricting a function when a counter value reaches a limiting value will be described below by using a copy machine which can record sequential license information as an example.

In the copy machine according to the embodiment, the number of copies can be restricted by using a counter mechanism. In other words, when a counter value reaches the upper limit designated by license information, a copy function of the copy machine is disabled.

The copy machine described in the embodiment includes a scanner section as an image reading device for reading a manuscript, a printer section as a printing device for printing the read image, and a control unit or the like connected to the sections for performing various kinds of control, like a typical copy machine. A user gives various indications to the control unit of the copy machine by pressing "Start Copy Button" so that the copy machine can perform the indicated copying operation.

Figure 1:
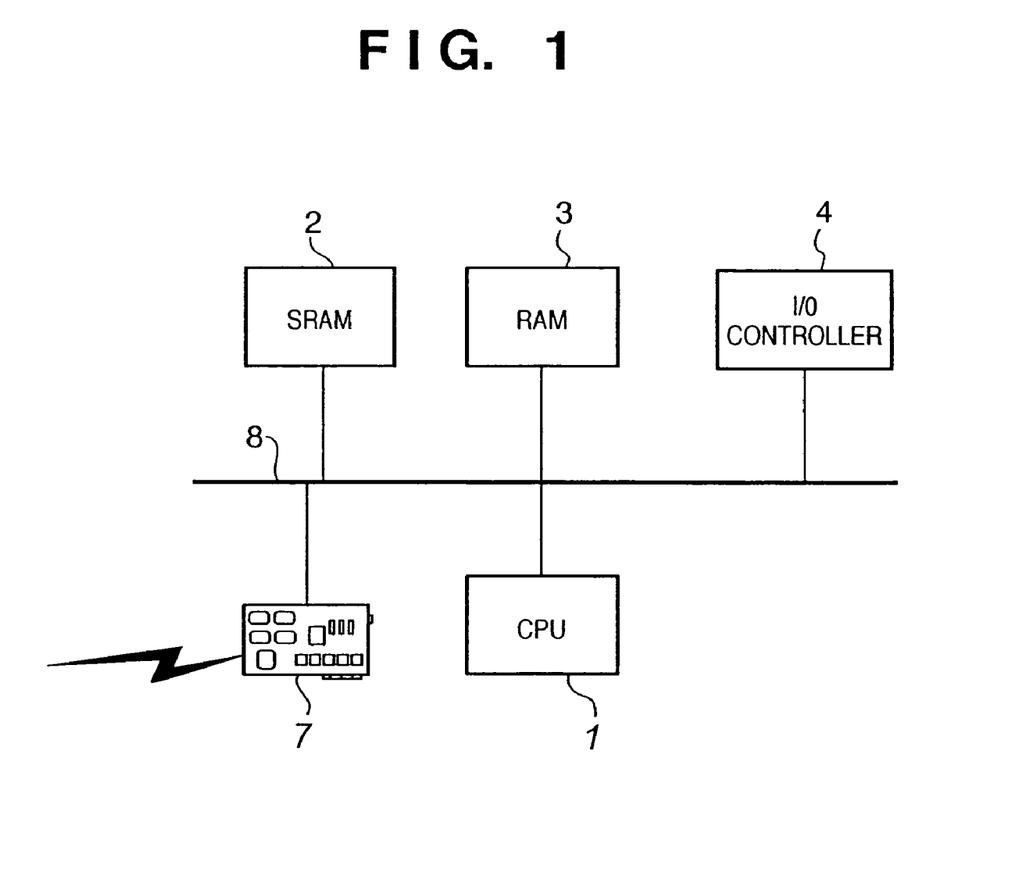
FIG. 1 is a hardware block diagram of a control unit for controlling a copy machine according to an embodiment of the present invention.

FIG. 1 is a hardware block diagram of a control unit for controlling a copy machine according to an embodiment of the present invention. In FIG. 1, the reference numeral 1 designates a CPU (central processing unit) of the copy machine, which executes software implementing a controlling method described later. The reference numeral 2 designates a nonvolatile memory (SRAM), the recording mechanism which can save the recorded contents even if a main power of the copy machine is turned off. In the embodiment, license information supplied to the copy machine in the past is recorded in the SRAM 2.

The reference numeral 3 designates a volatile memory (RAM), which has a function of temporarily storing information required when the CPU 1 executes the abovementioned software. The reference numeral 4 designates an I/O controller, which embodies a copy function such as processing a scanner section manuscript or printing an image according to indication from the CPU 1. The I/O controller 4 also detects that the user presses Start Copy Button. The reference numeral 7 designates a network card providing display information for a web browser connected to a network such as a LAN represented as Ethernet (registered trademark) or the Internet. The reference numeral 8 designates a bus for controlling information flows among components by connecting respective components of the abovementioned CPU 1, SRAM 2, RAM 3, I/O controller 4 and network card 7.

Figure 2:
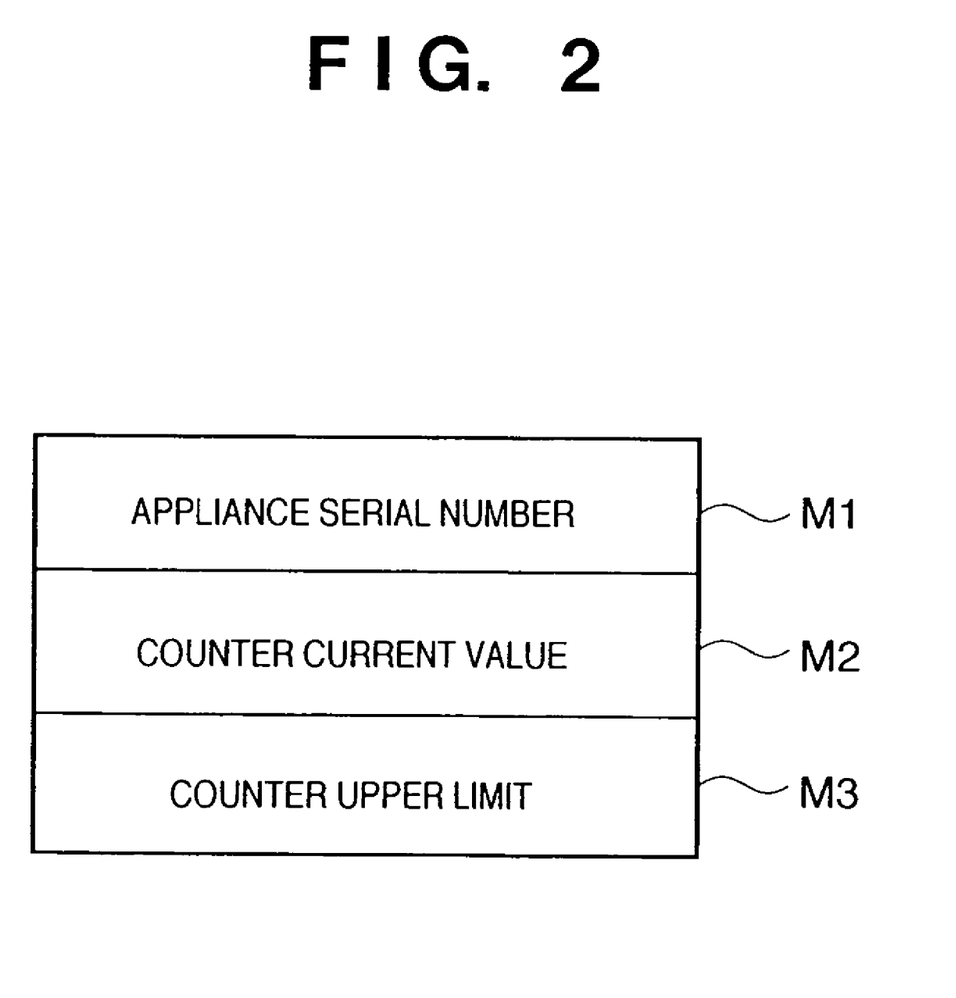
FIG. 2 is a diagram showing a partial arrangement of information recorded in the SRAM 2 of the copy machine of the embodiment.

FIG. 2 a diagram showing a partial arrangement of license information (license file) recorded in the SRAM 2 of the copy machine of the embodiment. As shown in FIG. 2, the SRAM 2 records (stores) an appliance serial number M1, which is identification information of the copy machine, a counter current value M2 and a counter upper limit M3. The appliance serial number M1 is a unique identification number assigned for each copy machine. The counter current value M2 saved in the SRAM 2 is incremented by one each time the copy machine performs a copying operation and discharges a sheet of paper. When the counter current value M2 becomes equal to the counter upper limit M3, a function of the information processing apparatus is restricted so that no copying operation is started even if a user presses Start Copy Button thereafter.

Figure 3:
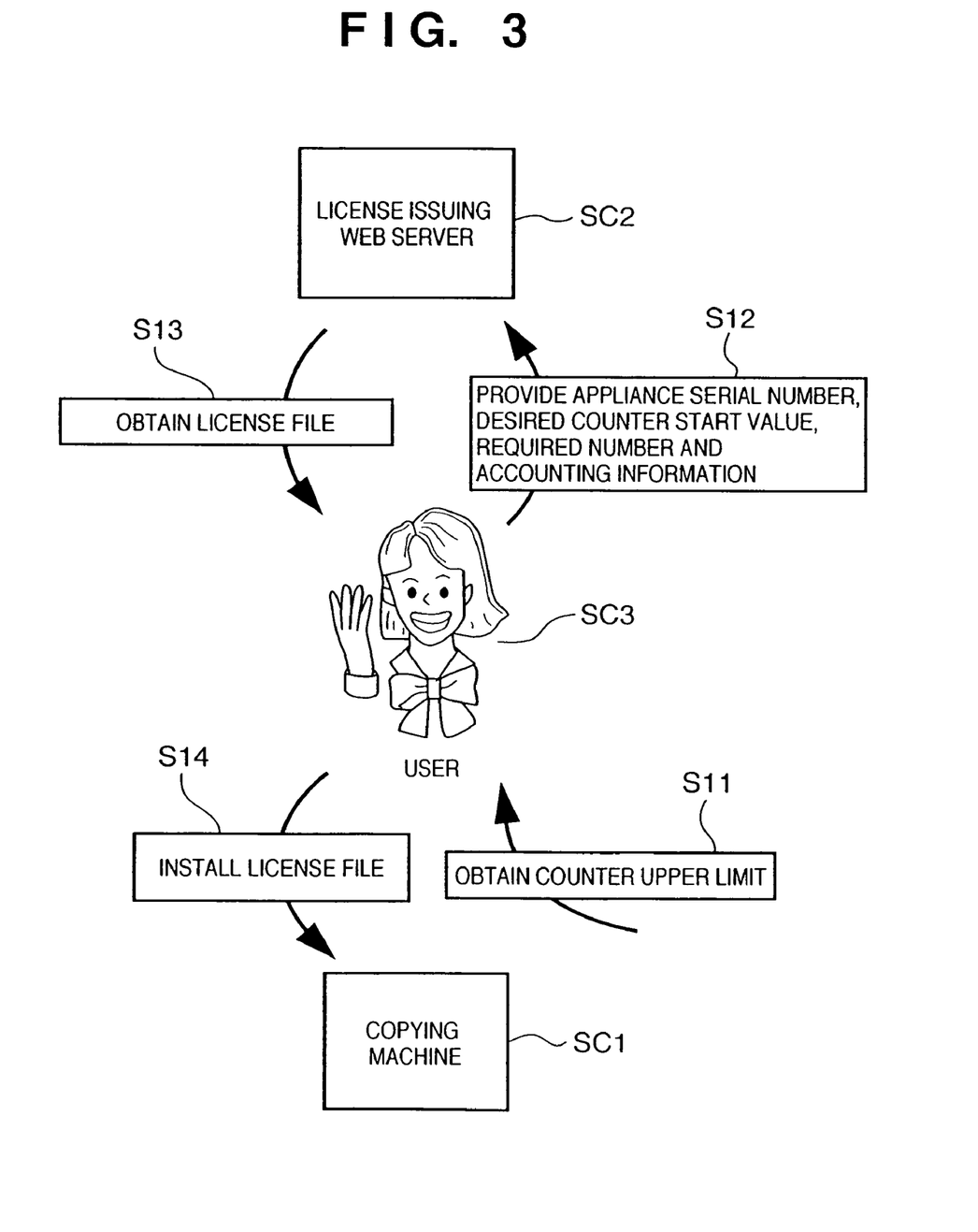
FIG. 3 is a schematic view showing an assumed scenario on supplying license information to the copy machine according to the embodiment.

FIG. 3 is a schematic view showing an assumed scenario on supplying license information to the copy machine according to the embodiment. In the embodiment, license information is embodied in the form of a license file described later so that a user can easily carry the information by saving (storing) it on a transportable recording medium (storage medium) detachable to the copy machine.

As shown in FIG. 3, an environment where the copy machine SC1 according to the embodiment is placed includes a web server (license issuing web server) SC2 for issuing a license file and a user SC3 performing a copying operation with the copy machine SC1.

The copy machine SC1 is adapted to restrict the copy function when the counter mechanism makes the counter current value M2 reach the counter upper limit M3 as mentioned above. Thus, a user SC3 needs to update the counter upper limit M3 if required. In the embodiment, the user SC3 uses the license issuing web server SC2, for example, accesses license issuing web server SC2 connected via a network such as the Internet (registered trademark) from the user's PC (personal computer), and obtains a license file. As the license issuing web server SC2 is provided with an accounting function, it can be adapted to ask a user, who tries to obtain a license file, to input accounting information such as a credit card number or the like and charge the credit card according to the upper limit required by the user.

A procedure of creating a license file will be described with reference to FIG. 3. First, the user SC3 obtains the counter upper limit currently set in a copy machine SC1 in a certain way (step S11). For example, the license information, which is stored in SRAM shown in FIG. 2, can be displayed in an operation screen (not shown) of the copy machine SC1. The user can get the upper limit, which has been set in a license file, from a record of the license file or the like created in the past. Next, the user provides the obtained upper limit as a desired counter start value along with an appliance serial number of the copy machine M1, the number of copies needed (required number) and accounting information including credit card information for accounting for a license issuing web server SC2 (step S12).

The license issuing web server SC2 issues a license file based on the provided information and the license file is provided from the license issuing web server SC2 to the user SC3 (step S13). Then, the user SC3 saves the obtained license file on hard disk of the user's PC.

Figure 4:
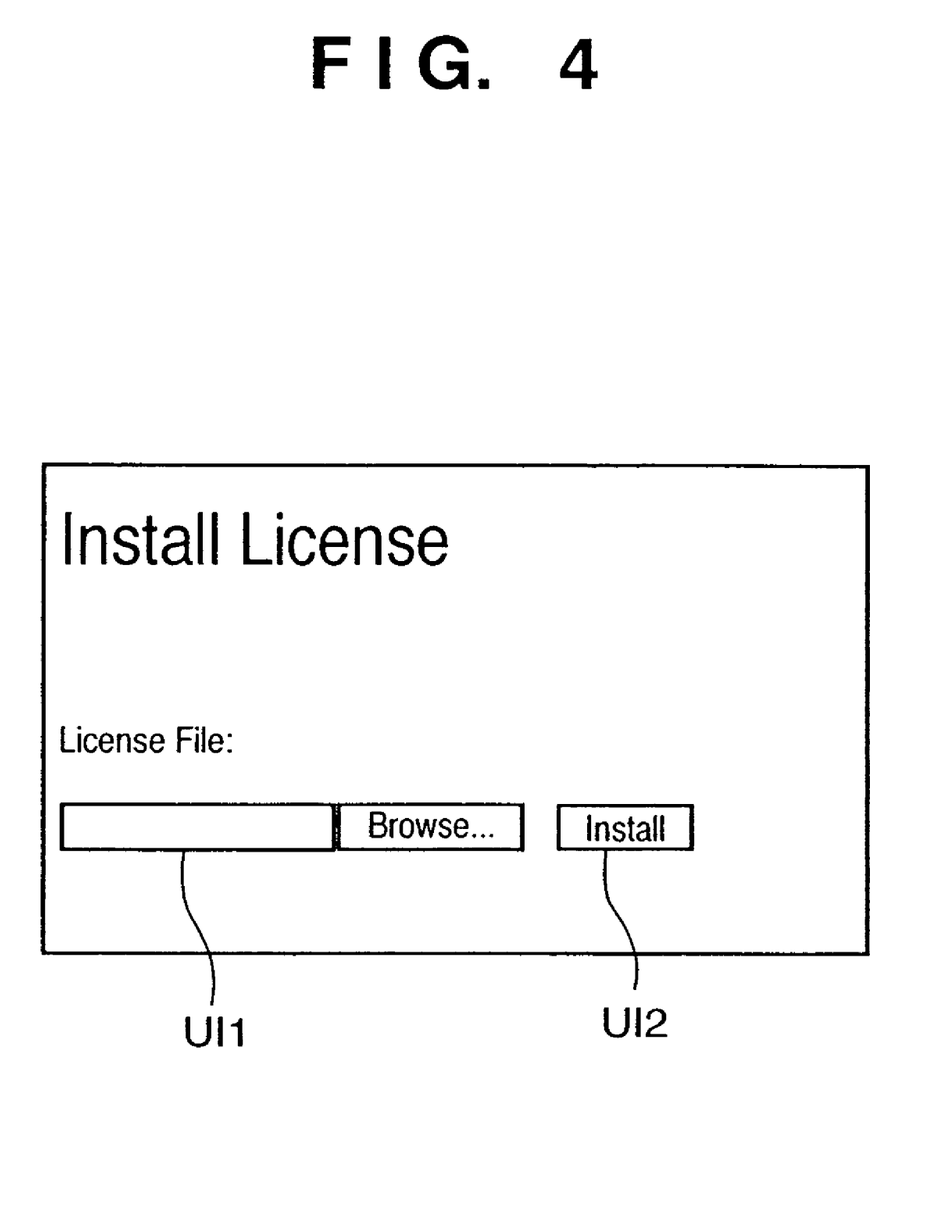
FIG. 4 is a diagram showing a display of a web page for license file install presented by the copy machine according to the embodiment.

The user SC3 activates a web browser of the user's PC saving the license file and displays a web page presented by the copy machine SC1. FIG. 4 is a diagram showing a display of a web page for license file install presented by the copy machine according to the embodiment. As shown in FIG. 4, the displayed web page includes an input field UI1 for the file name of a license file and a button UI2 for indicating execution of the installation.

The user SC3 clicks mouse or the like on the input field UI1 for the file name and inputs the file name of the license file obtained at step S13 through the keyboard or the like. When the user SC3 clicks on the button UI2, contents of the license file is sent to the copy machine SC1 by the web browser function, and the license file is installed in the copy machine SC1.

Figure 5:
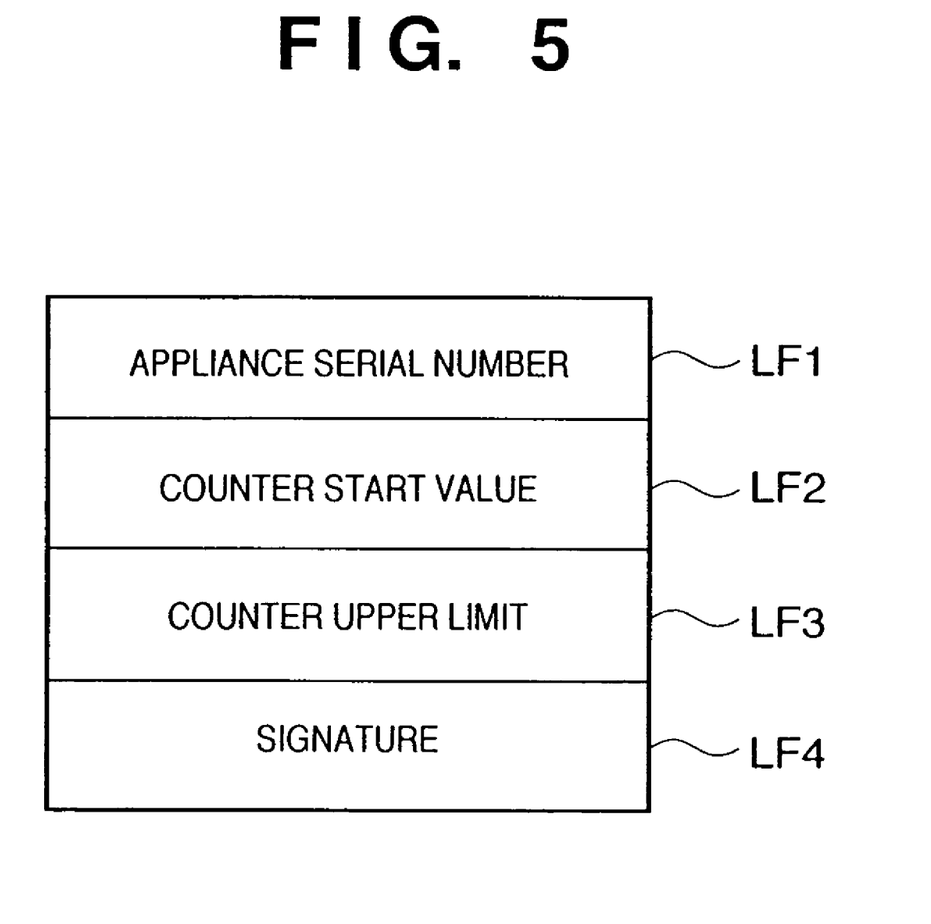
FIG. 5 is a diagram showing an exemplary configuration of a license file created by a license issuing web server SC2.

FIG. 5 is a diagram showing an exemplary configuration of a license file created by license issuing web server SC2. As shown in FIG. 5, as an appliance serial number LF1 and a counter start value LF2 and a counter upper limit LF3 among information included in the license file issued in the embodiment, respective pieces of information provided for the license issuing web server SC2 (an appliance serial number M1, a counter upper limit M3 and a counter upper limit M3 added with a counter value for the number of sheets required by the user, respectively) are set. In this manner, the embodiment has an effect in preventing the same license file being used in another copy machine by including appliance serial number LF1 in the license file.

In the license file issued in the embodiment, a signature LF4 is included as shown in FIG. 5. The signature LF4 is generated by applying a publicly known hash function to an appliance serial number LF1, a counter start value LF2 and a counter upper limit LF3 and coding the calculated hash value with a secret private key saved in the license issuing web server SC2. The tamper-proof is not limited to a method using the abovementioned signature LF4 that is generated by applying a hash function to an appliance serial number F1, and a method for encrypting information on an appliance serial number LF1 to a counter upper limit LF3 without using a hash function can be used to avoid tampering of the license file for guaranteeing the validity. In other words, the tamper-proof is not limited to a method using a signature and can be performed by any method if only the method can prevent a user or the like from tampering information on the appliance serial number LF1 to the counter upper limit LF3.

Figure 6:
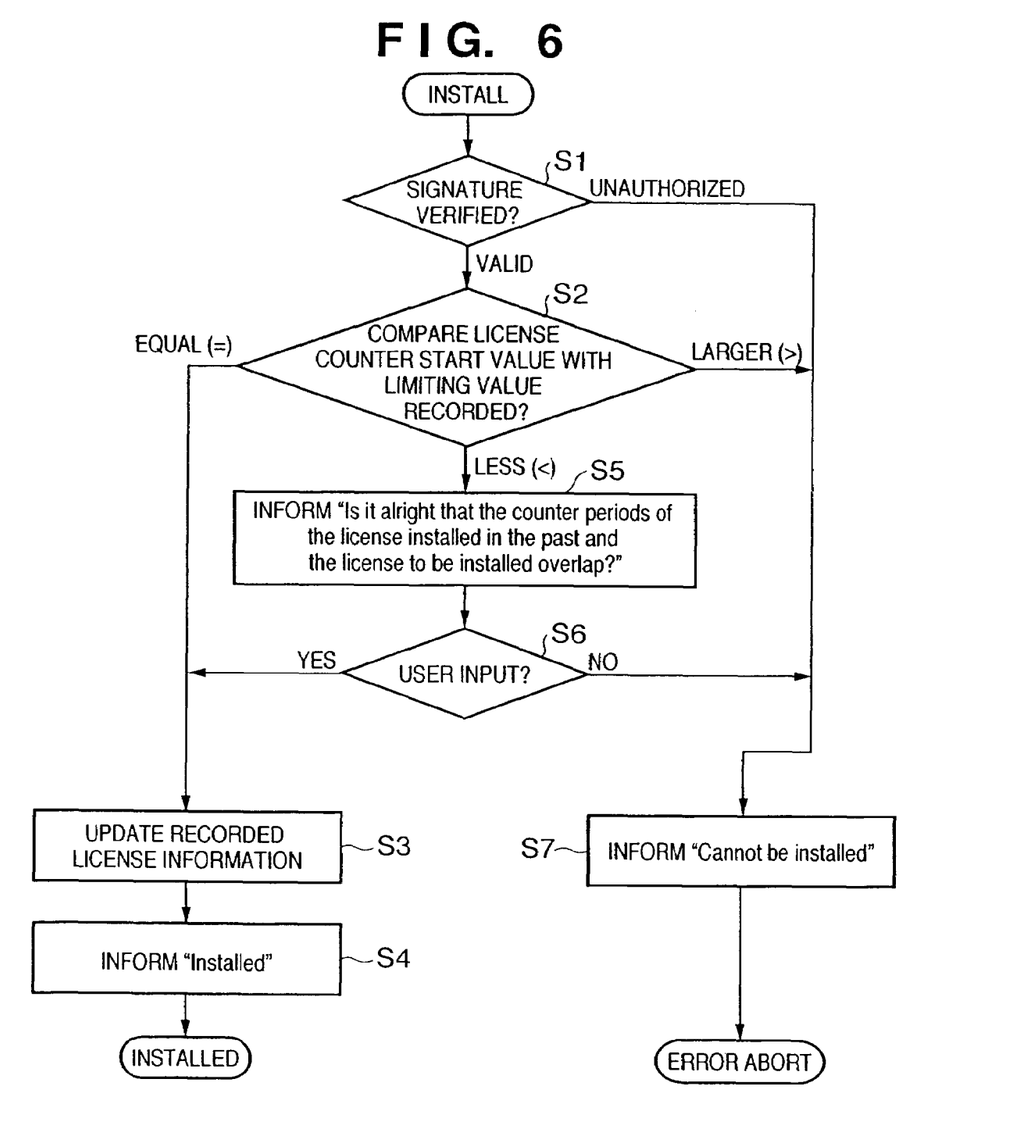
FIG. 6 is a flowchart for illustrating an exemplary algorithm performed by the CPU 1 after the license file is installed in the copy machine at step S14.

FIG. 6 is a flowchart for illustrating an exemplary algorithm performed by the CPU 1 after the license file is installed in the copy machine at step S14. First, the CPU 1 verifies validity of the installed license file (step S1). In the embodiment, the signature LF4 is checked for verifying validity of the license file. If the license file is determined as unauthorized (in the case of "Unauthorized"), the CPU 1 informs the user SC3 that it failed to install the license file, for example by displaying a message "Cannot be installed" (step S7). Then, the installation is aborted.

On the other hand, if the license file is confirmed to be valid (in the case of "Valid") at step S1, the CPU 1 further checks whether the supplied license file is the following information to the license file supplied in the past (step S2). Specifically, the CPU 1 compares the counter start value LF2 with the counter upper limit M3 recorded in the SRAM 2.

As a result, if the two values are the same (in the case of "Equal (=)") at step S2, the CPU 1 determines that the license continuity is confirmed and directly proceeds to step S3, where the counter upper limit M3 recorded on the SRAM2 is overwritten with the counter upper limit LF3 in the license file. Accordingly, information on the license recorded in the copy machine is updated. Then, the CPU 1 informs the user SC3 that it installed the license by displaying a message "Installed" (step S4).

On the other hand, if the counter start value LF2 in the license file (i.e., the obtained counter upper limit) is larger than the counter upper limit M3 in the SRAM 2 (in the case of "Larger (>)") at step S2, the continuity of the license is not kept. Then, the CPU 1 informs the user SC3 that it cannot install the license file, for example by displaying a message "Cannot be installed" (step S7).

If the counter start value LF2 in the license file is less than the upper limit M3 in the SRAM 2 (in the case of "Less (<)") at step S2, the CPU 1 displays a message "Is it alright that the counter periods of the license installed in the past and the license to be installed overlap?" to the user SC3 (step S5). This is because that usually periods of the counter start value and the counter upper limit do not overlap for each license file. Then, the CPU 1 checks the input performed by the user SC3 to the message (step S6).

As a result, if the user SC3 inputs to allow the overlap of the license periods (Yes) at step S6, the CPU 1 overwrites the counter upper limit M3 recorded in the SRAM 2 at the abovementioned step S3 with the counter upper limit LF3 of the license file. Then, the CPU 1 informs the user SC3 that the installation succeeded by displaying a message "Installed", for example.

The CPU 1 can confirm that the counter value to update is large enough by confirming that the counter upper limit M3 recorded in the SRAM2 is less than the counter upper limit LF3 of the license file before the process of step S3 in the flowchart of FIG. 6, and update the counter upper limit at step S3.

Installation of the license file is not limited to just once. The license file can be installed every time the file is obtained. In this case, the abovementioned algorithm is executed at each time of installation and the counter upper limit is updated.

As mentioned above, the copy machine according to the embodiment allows the user SC3 to increase the number of copies available by accessing the license issuing web site SC2 and purchasing the license. Although the abovementioned embodiment is described in the case when the counter value increases, the present invention can also be implemented in the case where the counter value decreases from the initial value to the lower limit (e.g., 0) by reversing the increase and decrease of the abovementioned embodiment.

When the counter start value is designated, the time for providing license information becomes critical. To avoid this problem, the apparatus can be provided with a mechanism for supplying multiple pieces of license information to accumulate license information. This saves the trouble of waiting for the time when the counter value reaches an appropriate value to install the license.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As mentioned above, the copy machine according to the embodiment can more simply implement a system for preventing license information applied in the past from being reused. Further, before the counter value reaches the upper limit, multiple pieces of license information can be applied without regard to the memory restriction of the unit, which is more convenient for a user.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-174603 filed on Jun. 11, 2004, the entire contents of which are hereby incorporated by reference herein.

What is claimed is:

1. An information processing apparatus with a counter function that restricts a function if a counter value reaches a limiting value, the apparatus comprising:
   a central processing unit; and
   a memory unit coupled to the central processing unit, the memory unit being configured to save the limiting value,
   wherein the central processing unit is configured to output the limiting value saved in the memory unit,
   wherein the central processing unit is configured to receive input license information including a counter start value for a new license and a new limiting value,
   wherein the central processing unit is configured to determine whether the input license information is valid based on the counter staff value and the limiting value saved in the memory unit,
   wherein the central processing unit is configured to update the limiting value saved in the memory unit to the new limiting value included in the input license information, if the central processing unit determines that the input license information is valid,
   wherein, if the central processing unit determines that the counter staff value included in the input license information is not larger than the limiting value saved in the memory unit, the central processing unit determines that the input license information is valid,
   wherein the input license information further includes identification information for identifying the information processing apparatus,
   wherein the central processing unit determines whether the input license information is valid using signature information that is generated by coding a hash value with a private key, and
   wherein the hash value is generated by applying a predetermined hash function to the identification information, the start value, and the new limiting value.

2. The information processing apparatus according to claim 1, wherein the central processing unit inputs multiple pieces of license information, and wherein the central processing unit updates respective pieces of license information at a predetermined time.

3. An information processing apparatus according to claim 1,
   wherein the information processing apparatus is incorporated in an information processing system, and
   wherein the information processing apparatus is a license server and the license server is configured to input identification information of the information processing apparatus, a current counter value, and a required count number, and to generate license information including the identification information and the new limiting value calculated from the current counter value and the required count number.

4. The information processing system according to claim 3, wherein the license server is configured to input information on an entity to be charged for a credit payment, and to charge the entity according to the required count number.

5. A controlling method performed by an information processing apparatus with a counter function that restricts a function if a counter value reaches a limiting value, comprising:
   a saving step of saving the limiting value in a saving device;
   an inputting step of inputting license information including a counter start value for a new license and a new limiting value;

a determining step of determining whether the input license information is valid based on the counter staff value and the limiting value saved in the saving device; and an updating step of updating the limiting value saved in the saving device to the new limiting value included in the license information, if the determination step determines that the license information is valid, wherein, if it is determined that the counter start value included in the input license information is not larger than the limiting value saved in the memory unit, the determining step determines that the input license information is valid, wherein the input license information further includes identification information for identifying the information processing apparatus, wherein the determining step determines whether the input license information is valid using signature information that is generated by coding a hash value with a private key, and wherein the hash value is generated by applying a predetermined hash function to the identification information, the start value, and the new limiting value.

6. A computer-readable storage medium for storing a computer-executable program for causing a computer, which controls an information processing apparatus with a counter function that restricts a function if a counter value reaches a limiting value, to execute:

a saving procedure of saving the limiting value;

an inputting procedure of inputting license information including a counter start value for a new license and a new limiting value;

a determining procedure of determining whether the input license information is valid based on the counter start value and the limiting value; and an updating procedure of updating the limiting value saved in the saving procedure to the new limiting value included in the license information, if the determination procedure determines that the license information is valid, wherein, if it is determined that the counter start value included in the input license information is not larger than the limiting value saved in the memory unit, the determining procedure determines that the input license information is valid, wherein the input license information further includes identification information for identifying the information processing apparatus, wherein the determining procedure determines whether the input license information is valid using signature information that is generated by coding a hash value with a private key, and wherein the hash value is generated by applying a predetermined hash function to the identification information, the start value, and the new limiting value.

* * * * *